March 13, 1928.

W. O. LAUBE 1,662,522

COMBINED FUNERAL CANOPY AND STAND

Filed Nov. 19, 1926       5 Sheets-Sheet 1

Inventor
Walter O. Laube.
By Lacey & Lacey, Attorneys

March 13, 1928.
W. O. LAUBE
1,662,522
COMBINED FUNERAL CANOPY AND STAND
Filed Nov. 19, 1926   5 Sheets-Sheet 2
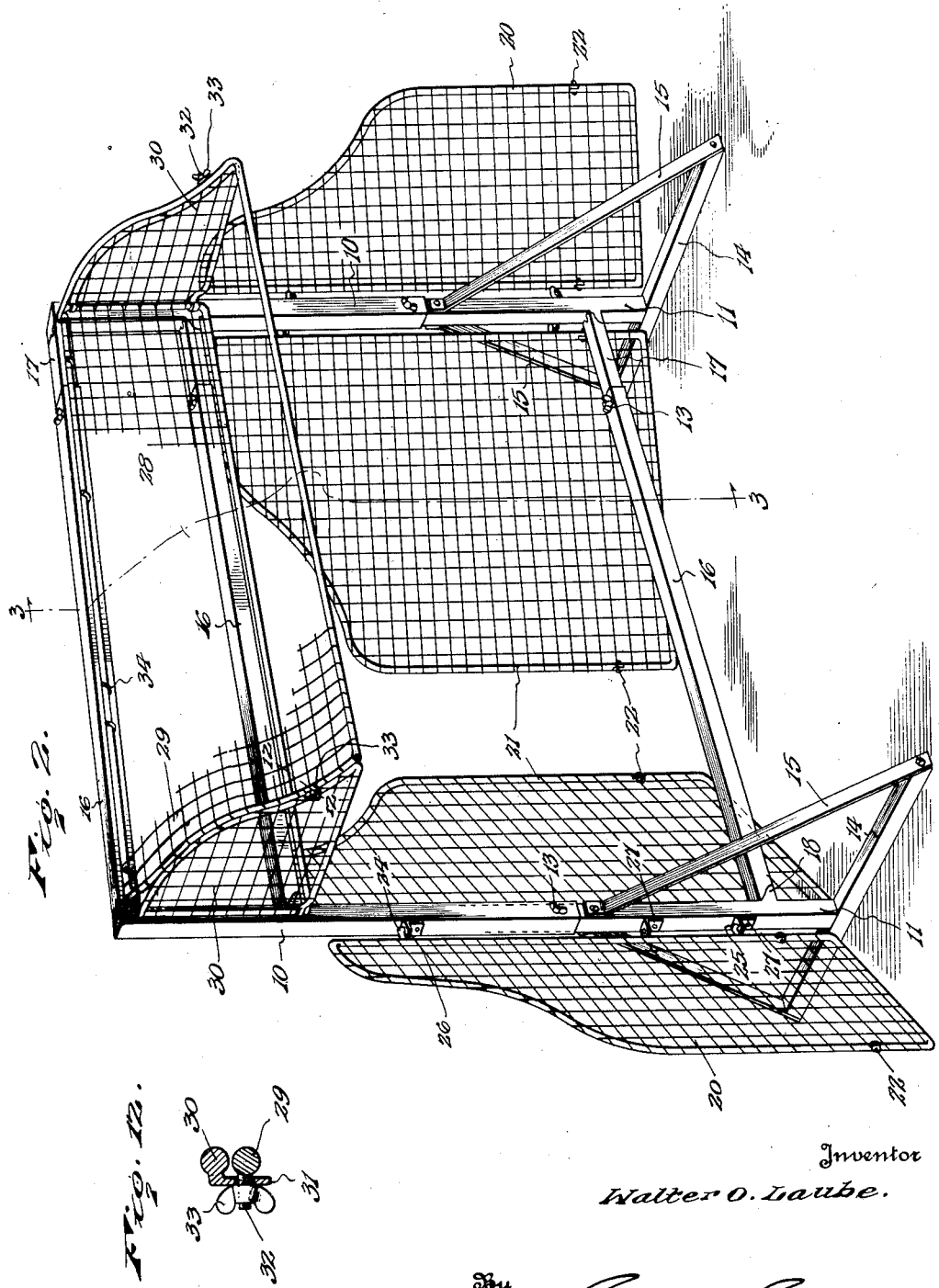
Inventor
Walter O. Laube.
By Lacey & Lacey, Attorneys March 13, 1928.
W. O. LAUBE
1,662,522
COMBINED FUNERAL CANOPY AND STAND
Filed Nov. 19, 1926 5 Sheets-Sheet 3
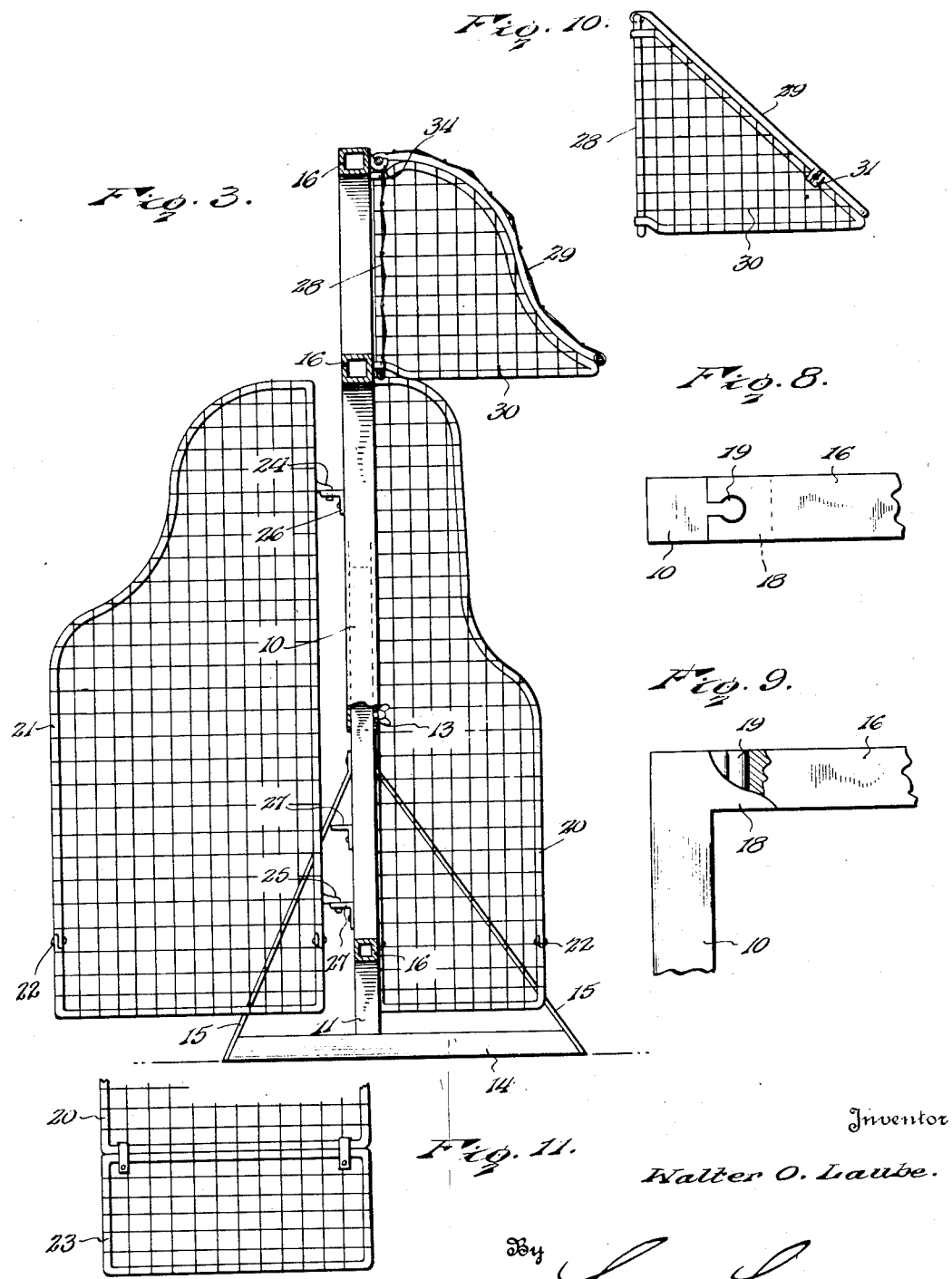
Inventor
Walter O. Laube.
By Lacey & Lacey, Attorneys March 13, 1928. 1,662,522
W. O. LAUBE
COMBINED FUNERAL CANOPY AND STAND
Filed Nov. 19, 1926 5 Sheets-Sheet 4
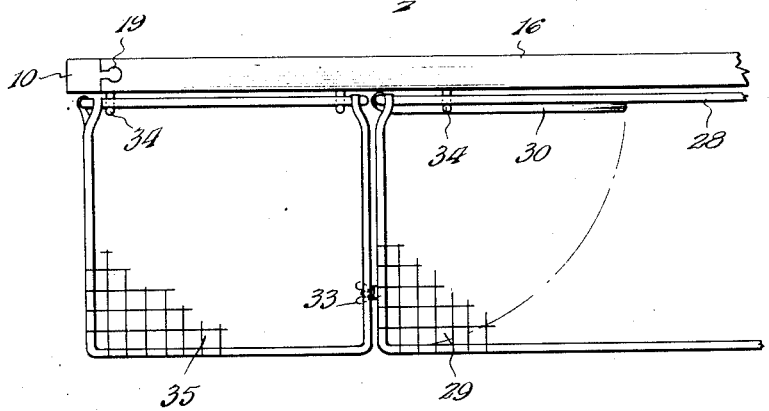
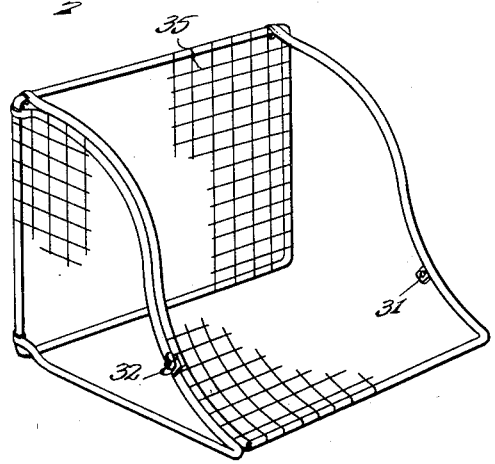
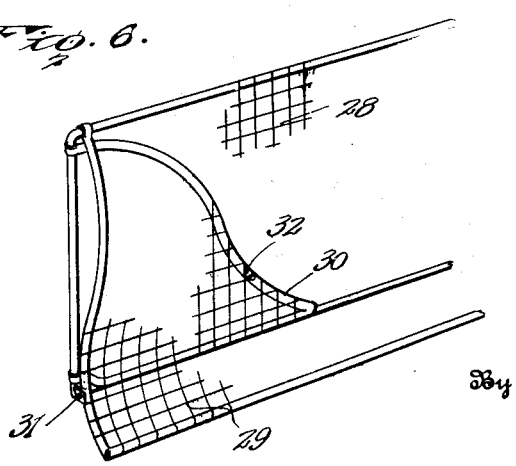
Inventor
Walter O. Laube.
By Lacey & Lacey, Attorneys March 13, 1928.
W. O. LAUBE
1,662,522
COMBINED FUNERAL CANOPY AND STAND
Filed Nov. 19, 1926   5 Sheets-Sheet 5
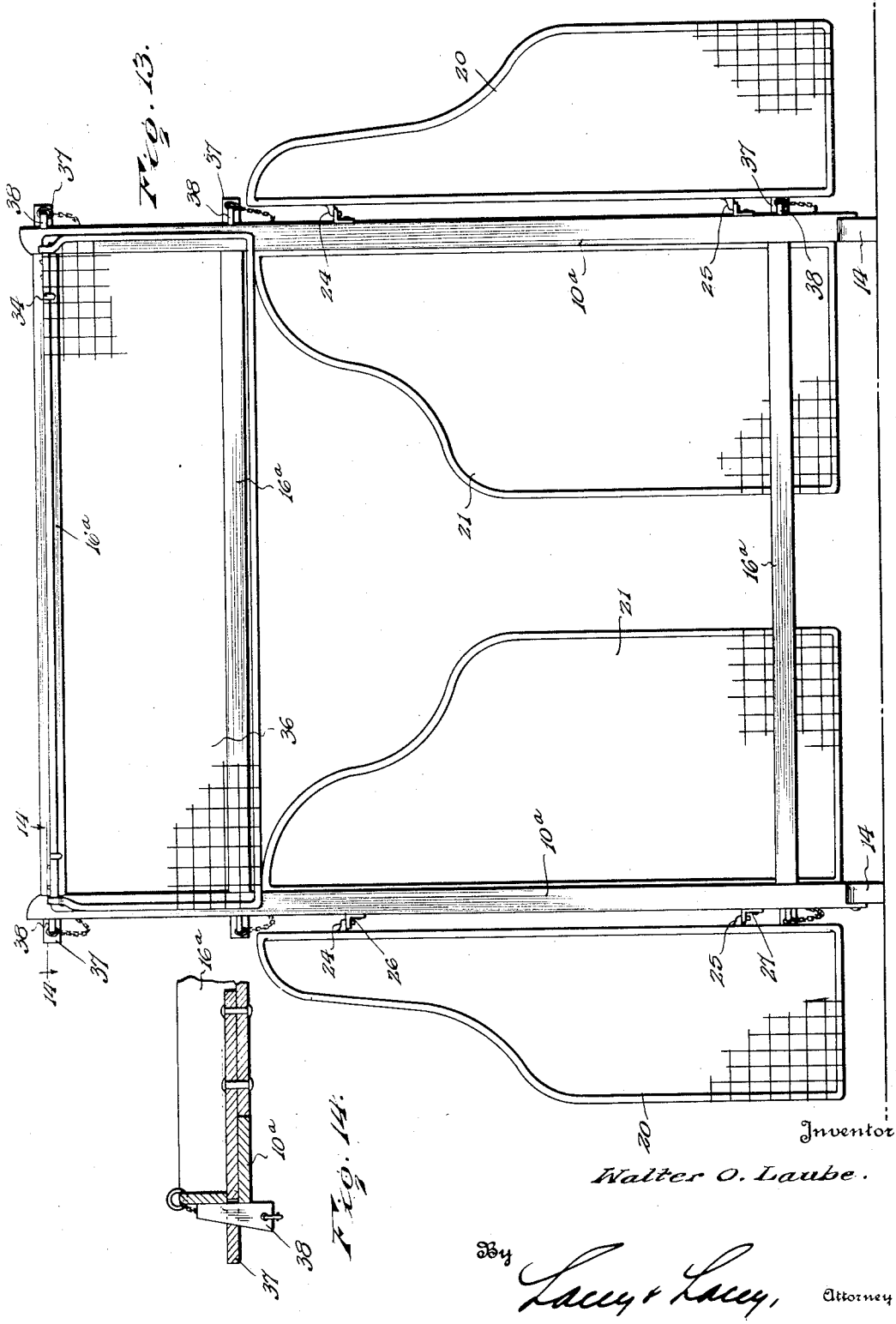
Inventor
Walter O. Laube.
By Lacey & Lacey, Attorneys Patented Mar. 13, 1928.

1,662,522

UNITED STATES PATENT OFFICE.

WALTER O. LAUBE, OF CHICAGO, ILLINOIS, ASSIGNOR TO OLGA LAUBE, OF CHICAGO, ILLINOIS.

COMBINED FUNERAL CANOPY AND STAND.

Application filed November 19, 1926. Serial No. 149,418.

This invention provides an article which obviates the use of palms and other plants for decorative purposes, at funerals, weddings and social functions, and the loss incident to the exposure of such plants to freezing weather and rough handling.

The invention supplies a contrivance, including a stand and canopy, which may be readily handled and stowed in a small space and which is adjustable to meet varying conditions, as to purpose and location, and which is susceptible of receiving floral decorations, as well as goods of various kinds, vines and branches of trees and plants according to the effect to be produced and the decorative scheme suggested by the nature of the function.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 2 is a perspective view of the device with the parts in substantially the same relation as illustrated in Figure 1.

Figure 3 is a vertical transverse sectional view on the line 3—3 of Figure 2, looking to the right, as designated by the arrows.

Figure 4 is a top plan view of an end portion of the canopy having an extension added thereto.

Figure 5 is a perspective view of the extension shown in Figure 4.

Figure 6 is a detail perspective view of an end portion of the canopy showing the same folded.

Figure 7 is a side view of a wing after floral decorations have been applied thereto.

Figure 8 is a top plan view showing the joint between an upright of the stand and a cross bar.

Figure 9 is an elevational view of the part illustrated in Figure 8.

Figure 10 is an end view of a modified form of canopy.

Figure 11 is a detail view showing an extension added to one of the wings.

Figure 12 is an enlarged sectional view on the line 12—12 of Figure 2.

Figure 13 is a view similar to Figure 1, of a modification, in which the stand and canopy are of fixed proportions, and Figure 14 is an enlarged sectional view on the line 14—14 of Figure 13.

Corresponding and like parts are referred to in the following description and designated in the several views of the drawings by like reference characters.

Figure 1:
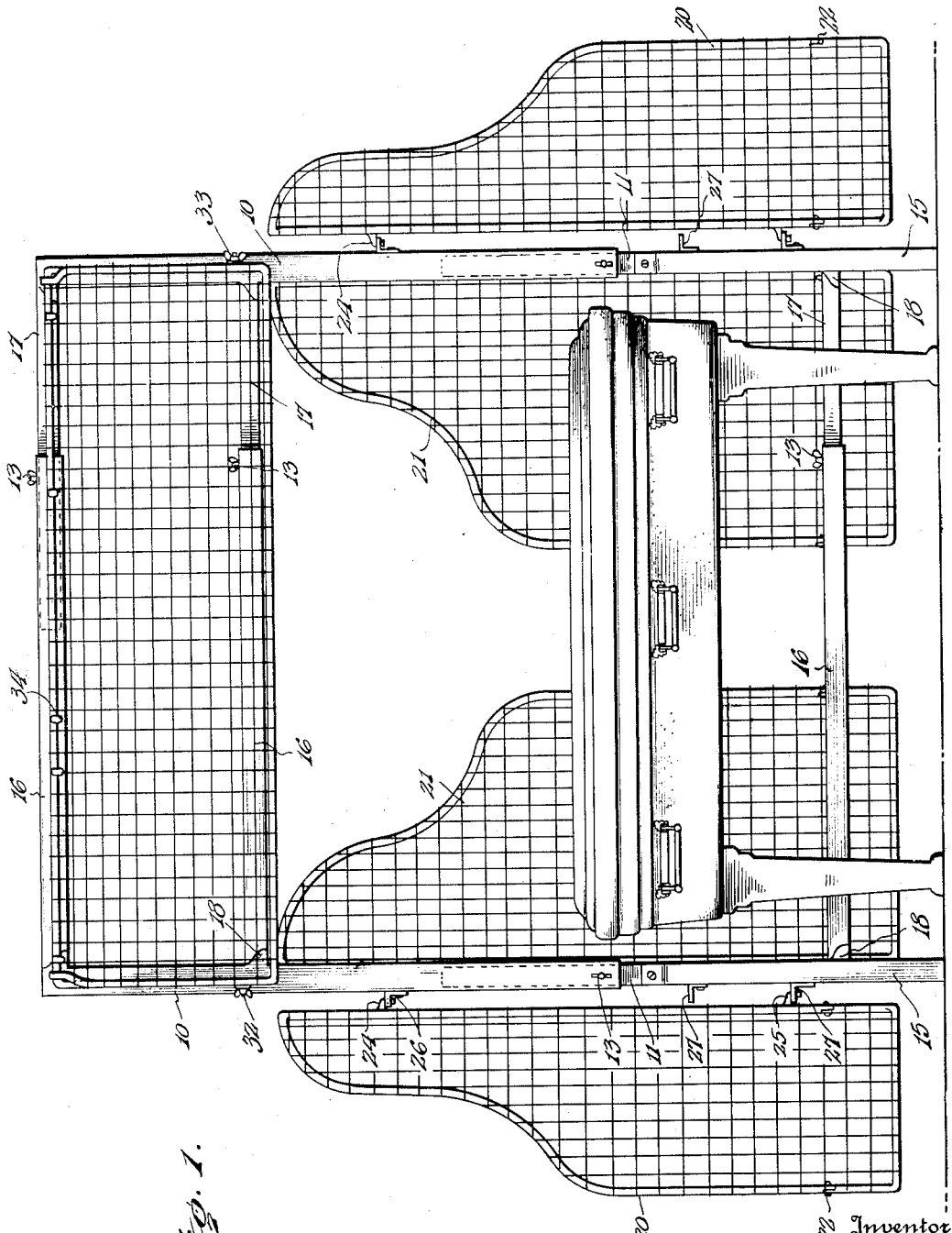
Figure 1 is an elevational view of a combined stand and canopy embodying the invention, illustrating the same placed about a casket and devoid of decoration.

The stand comprises corresponding uprights and upper and lower connecting cross pieces, the several parts being preferably adjustable and detachable. The uprights are of similar, or like formation and comprise an upper section 10, and a lower section 11, the two sections having a telescopic connection to admit of the uprights being lengthened or shortened as required. Any suitable fastening means may be employed for securing the sections in an adjusted position. As indicated, thumb screws 13 are threaded into one section and are adapted to bindingly engage the companion section. Base pieces 14 are connected in any determinate way to the lower ends of the uprights and form supporting means therefor. Braces 15 connect opposite ends of the base pieces 14 with the lower section 11 of each of the uprights. The base pieces 14 project forwardly from the uprights a greater distance to stabilize the structure and offset the additional weight of the canopy which is disposed at the front side of the stand, being suspended from the upper cross bar and in bracing contact with the forward side of the uprights.

The uprights are connected by upper and lower cross bars, each comprising a main section 16 and an adjustable section 17, which have a telescopic connection in substantially the same manner as the sections comprising the uprights. Suitable fastening means, such as thumb screws 13, secure the sections 16 and 17 in the required adjusted position. Lugs 18 project laterally from the inner sides of the uprights and receive the ends of the cross bars. The lugs 18 constitute rests and the joint formed between the lugs and cross bars is scarfed and interlocked, as indicated most clearly in Figures 8 and 9. An interlocking tongue and slot constitute the joint which is designated by the numeral 19. This form of joint prevents downward displacement of the cross bars and lateral separation of the uprights therefrom, as will be readily appreciated.

Wings 20 are hingedly connected to the outer sides of the uprights and other wings 21 are hingedly connected to the rear sides of the uprights. These wings are of similar formation, but may vary in size and outline substantially as indicated in Figure 3. Each of the wings consists of a stout frame and a filling of wire having a mesh of any determinate size and form. The wings may be adjusted to any required angle to meet any condition of design, or location, and an end portion of each of the wings is hinged, as indicated at 22, whereby provision is had for varying the length of the wing, as occasion may require. When the lower hinged portion of the wing is folded against the main portion, the length of the wing is reduced, as will be readily appreciated, and when the hinged portion is extended the wing is of maximum length. To further increase the length of the wings a separate section 23 may be provided and clipped or otherwise attached to the lower end of the wing, as indicated most clearly in Figure 11. Each of the wings is provided with an upper hook 24 and a lower hook 25, which constitute pintle elements to cooperate with bracket lugs 26 and 27 applied to the respective sections 10 and 11 of each of the uprights. When adjusting the length of the uprights the wings move upwardly therewith, but the lower pintle elements 25 move from one to the other of the lugs 27 and engage a selected lug so as to properly support the wing in the adjusted position. To meet this condition the lower sections 11 of the uprights will be provided with a plurality of lugs 27 spaced apart a distance to provide for a variety of adjustments.

The canopy comprises a back 28, a top 29, and ends 30. These several parts, like the wings, include a stout frame and a wire filling. The design of the canopy may vary and, as indicated most clearly in Figure 3, the top, in end elevation, is of ogee outline, but the same may be straight, as shown in Figure 10. The back 28 and top 29 are pivotally connected at their upper edges to admit of the one folding upon the other, as indicated in Figure 6. To allow for the folding of the canopy the end pieces 30 are pivotally connected to the ends of the back 28 so as to fold thereagainst, and are detachably connected to the ends of the top 29. Any suitable fastening means may be employed for connecting the ends 30 and top 29, and as indicated in Figure 12 a cleat 31 projects from the frame of one of the parts and is apertured to receive a threaded stem 32 projecting from the frame of the other part, a thumb nut 33 fitted upon the projecting end of the stem 32 serving to secure the cleat 31, and thereby secure the parts comprising the canopy when extended. The canopy is adapted to be suspended from the upper cross bar of the stand by any determinate means and, as shown, hooks 34 are provided along the length of the upper cross bar and the canopy is suspended therefrom, the ends of the canopy engaging the uprights to maintain the canopy in proper position. When it is required to increase the length of the canopy to meet the width of the stand an extension 35 is provided, the same being constructed in all essential particulars similar to the canopy so as to conform thereto. This extension is shown most clearly in Figures 4 and 5, and comprises a back, a top and ends, the latter being foldable against the back in a manner similar to the ends 30 of the canopy to admit of collapsing of the extension for convenience of handling and storing in a small space. It is to be understood that extensions of different lengths will be supplied so that the canopy may be adjusted to any required length. When the extension is in position, the adjacent end of the canopy is folded against the back, as indicated most clearly in Figure 4, and the contiguous ends of the canopy and extensions are connected by means similar to those employed for securing the ends to the top of the canopy. The end of the extension 35 adapted to abut the end of the canopy is not supplied with a filling of wire, as shown most clearly in Figure 5, so that when the extension is in place the lower side of the canopy is unobstructed throughout its length. In the modification shown in Figure 6 the uprights 10 are fixed and adapted to be connected by upper and lower cross bars 16ª which are likewise of a fixed length. The wings 20 and 21 are pivoted or hinged to the uprights in substantially the same manner, as hereinbefore indicated. The canopy 36 is suspended from the upper cross bar 16ª, substantially as hereinbefore described. The uprights 10ª and the cross bars 16ª are of L-form and one of the wings of the cross bars is extended, as indicated at 37, to pass through openings in a wing of the uprights, said extensions 37 being apertured to receive keys 38, whereby the parts are made secure when assembled. The extensions 37 preferably form a part of a strip riveted to the cross bar, as indicated most clearly in Figure 14. The modified form of canopy is fixed as to dimensions, and is adapted for general use, whereas the preferred form is adjustable to meet varying conditions and locations.

In effect the invention provides a decorative form which, when set up, is covered with floral embellishments and ornamental adornments of textile or other suitable material adapted for the occasion and decorative scheme to be effected. Vines, such as smilax are interwoven with the meshed filling of the wings and sides of the canopy and flowers and branches of plants have their stems interlaced with the meshes of the filling, so as to be retained in the located position, and fabric, such as plush and silk, may be applied to the canopy and other parts in graceful folds and festoons, according to the art and skill of the decorator. The device provides for a variety of decoration to meet the requirements of funerals, nuptials, receptions and other ceremonies and functions, thereby producing an effect superior in many instances to the use of palms and plants, at a less cost and obviating the loss occasioned when such plants are subjected to extreme cold weather and rough usage. By constructing the device so as to be readily collapsed it may be easily handled and conveniently stored in a small space, and the adjustable feature provides for quickly adjusting the form to meet varying conditions incident to location and the nature of the function to be enlivened by a floral or analogous decoration.

Having thus described the invention, I claim:

1. A decorative form comprising an adjustable supporting frame, and a sectional ornamental receiving canopy at one side of the frame detachably connected at its top thereto and having a depending portion engaging the frame to bracingly sustain the canopy in operative position.

2. A decorative form comprising a stand including uprights and connecting members, a pair of ornament receiving wings pivoted to each of the uprights, and a canopy at one side of the stand detachably connected to the said connecting members above the wings.

3. A decorative form comprising a stand including extensible uprights, an ornament receiving canopy at the top of the stand and adjustable vertically with the uprights, and ornament receiving wings pivoted to each of the uprights and adapted to extend in opposite directions and swing reversely.

4. A decorative form comprising uprights, each of the uprights consisting of an upper vertically adjustable section and a lower fixed section, ornament receiving wings pivoted to the upper sections and adjustable vertically therewith, and means pivotally and adjustably connecting the wings to the respective lower sections.

5. A decorative form comprising uprights, each of the uprights consisting of an upper vertically adjustable section and a lower fixed section, ornament receiving wings pivoted to the upper sections and adjustable vertically therewith, means pivotally and adjustably connecting the wings to the respective lower sections, and an ornament receiving canopy attached to and movable with the upper sections of the said uprights.

6. A decorative form comprising extensible uprights, extensible members adjustably connecting the uprights, a pair of ornament receiving wings pivoted to each of the uprights and adjustable therewith, and an extensible ornament receiving canopy detachably connected to the top extensible member and comprising a back, a folding top and folding ends, the back bracingly engaging the uprights to support the canopy at one side thereof.

7. A decorative form comprising uprights, an ornament receiving canopy at the top of the uprights, ornament receiving wings pivoted to the uprights below the canopy and facing inwardly and adapted to swing forwardly and rearwardly at their inner opposing vertical edges, and other ornament receiving wings pivoted to the uprights and adapted to extend outwardly therefrom and to swing laterally.

8. A decorative form comprising extensible uprights and extensible ornament receiving wings pivoted to a section of the uprights and pivotally and adjustably connected to the other section of the respective uprights.

9. A decorative form comprising extensible uprights, extensible members adjustably connecting the uprights, a sectional canopy at the top of the uprights, and adjustable wings pivoted to the sections of the respective uprights.

In testimony whereof I affix my signature.

WALTER O. LAUBE. [L. S.]